(12) United States Patent
Wakefield et al.

(10) Patent No.: US 9,404,593 B2
(45) Date of Patent: Aug. 2, 2016

(54) VENT VALVE

(71) Applicant: Hamilton Sundstrand Corporation, Windsor Locks, CT (US)

(72) Inventors: David L. Wakefield, Loves Park, IL (US); Dean A. Norem, Cherry Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 397 days.

(21) Appl. No.: 13/898,714

(22) Filed: May 21, 2013

(65) Prior Publication Data

US 2014/0345699 A1 Nov. 27, 2014

(51) Int. Cl.
| | |
|---|---|
| *F16K 31/12* | (2006.01) |
| *F16K 31/36* | (2006.01) |
| *F16K 11/07* | (2006.01) |
| *F16K 11/02* | (2006.01) |
| *F15B 13/01* | (2006.01) |
| *F15B 20/00* | (2006.01) |
| *B64C 13/40* | (2006.01) |
| *B64C 11/38* | (2006.01) |
| *B64C 27/64* | (2006.01) |

(52) U.S. Cl.
CPC ............... *F16K 11/02* (2013.01); *F15B 13/01* (2013.01); *F15B 20/004* (2013.01); *B64C 11/38* (2013.01); *B64C 13/40* (2013.01); *B64C 27/64* (2013.01); *Y10T 137/0324* (2015.04); *Y10T 137/86582* (2015.04)

(58) Field of Classification Search
CPC ..... F16K 11/02; F16K 11/07; F16K 11/0704; B64C 11/38; B64C 11/385; B64C 11/40; B64C 11/42; B64C 13/40; B64C 27/64; F15B 13/01; F15B 20/004
USPC .............................................. 137/486, 625.69
See application file for complete search history.

(56) References Cited

U.S. PATENT DOCUMENTS

| | | | | |
|---|---|---|---|---|
| 3,219,121 | A | * 11/1965 | Barden | ......................... 416/154 |
| 4,813,447 | A | 3/1989 | Ichiryu et al. | |
| 4,913,190 | A | * 4/1990 | Kugler | ..................... 137/624.27 |
| 5,271,598 | A | 12/1993 | Hohenshil et al. | |
| 5,460,199 | A | 10/1995 | Takata et al. | |
| 5,623,861 | A | 4/1997 | Ward et al. | |
| 6,941,933 | B2 | 9/2005 | Veinotte et al. | |
| 7,076,351 | B2 | 7/2006 | Hamilton et al. | |
| 2007/0113906 | A1* | 5/2007 | Sturman et al. | .......... 137/625.65 |

(Continued)

FOREIGN PATENT DOCUMENTS

WO 2007132489 11/2007

OTHER PUBLICATIONS

European Search Report for Application No. 14169043.8, mailed Oct. 24, 2014.

*Primary Examiner* — John K Fristoe, Jr.
*Assistant Examiner* — Kelsey Rohman
(74) *Attorney, Agent, or Firm* — Carlson, Gaskey & Olds, P.C.

(57) ABSTRACT

A vent valve according to an exemplary aspect of the present disclosure includes, among other things, a sensing sleeve defining a sensing chamber and a vent channel for venting fluid out of the sensing chamber. A sensing piston is moveable within the sensing chamber between an open position and a closed position. The sensing piston allows flow of the fluid into the vent channel during movement of the sensing piston between the open and closed positions.

7 Claims, 4 Drawing Sheets

(56) References Cited

U.S. PATENT DOCUMENTS

| | | | |
|---|---|---|---|
| 2007/0212221 A1* | 9/2007 | Carvalho | B64C 11/303 416/46 |
| 2008/0245904 A1 | 10/2008 | Harcombe et al. | |
| 2009/0108225 A1 | 4/2009 | Kubo et al. | |
| 2010/0270487 A1 | 10/2010 | Ambrose | |
| 2012/0326070 A1 | 12/2012 | Johnson et al. | |
| 2013/0025725 A1 | 1/2013 | Gotch | |
| 2013/0269808 A1 | 10/2013 | Liukkunen | |
| 2014/0116546 A1* | 5/2014 | Pruden et al. | 137/565.29 |

* cited by examiner

VENT VALVE

BACKGROUND

This disclosure relates to a fluid actuated valve, and more particularly to a fluid actuated valve having venting features.

Some rotary aircraft include one or more propeller blades driven by a gas turbine engine. The rotary aircraft may include a hydraulically actuated propeller pitch control assembly configured to adjust and maintain a pitch of each of the propeller blades. Generally, the pitch of each of the propeller blades corresponds to an amount of thrust generated by the propeller blades.

In some instances, maneuvering the rotary aircraft may produce a loss of pressure to the propeller pitch control assembly. The loss of pressure may prevent the pitch control assembly from maintaining the pitch of the propeller blades, and in some cases causing a loss of thrust. The propeller pitch control assembly may include a propeller pitch lock to maintain the pitch of the blades until the pressure to the propeller pitch control assembly is restored.

SUMMARY

A vent valve according to an exemplary aspect of the present disclosure includes, among other things, a sensing sleeve defining a sensing chamber and a vent channel for venting fluid out of the sensing chamber. A sensing piston is moveable within the sensing chamber between an open position and a closed position. The sensing piston allows flow of the fluid into the vent channel during movement of the sensing piston between the open and closed positions.

In a further non-limiting embodiment of the foregoing vent valve, the sensing piston is configured to restrict flow of the fluid into the vent channel in at least one of the open and closed positions.

In a further non-limiting embodiment of either of the foregoing vent valves, the sensing piston is configured to restrict flow of the fluid into the vent channel in both the open and closed positions.

In a further non-limiting embodiment of any of the foregoing vent valves, a first length of the sensing piston is less than a second length of the vent channel.

In a further non-limiting embodiment of any of the foregoing vent valves, the vent channel extends radially outward from an inner surface of the sensing chamber.

In a further non-limiting embodiment of any of the foregoing vent valves, a drain passage is in fluid communication with the vent channel.

In a further non-limiting embodiment of any of the foregoing vent valves, a shutoff spool is moveable within a porting sleeve between a locked position and an unlocked position in response to movement of the sensing piston. The shutoff spool is configured to restrict flow of a fluid through an actuation flow path when the shutoff spool is located in the locked position.

In a further non-limiting embodiment of any of the foregoing vent valves, the shutoff spool is attached to the sensing piston.

In a further non-limiting embodiment of any of the foregoing vent valves, a signal port is defined by the sensing sleeve. The sensing piston is moveable in response to a signal pressure provided at the signal port.

In a further non-limiting embodiment of any of the foregoing vent valves, a return spring is configured to locate the sensing piston in the closed position.

A control assembly according to an exemplary aspect of the present disclosure includes, among other things, an actuator operable in response to a change in flow of a fluid through an actuation flow path. A lock assembly includes a vent valve having a sensing sleeve and a sensing piston. The sensing sleeve defines a sensing chamber for receiving the sensing piston and defines a vent channel for venting the fluid out of the sensing chamber. The sensing piston is moveable within the sensing chamber between an open position and a closed position. The sensing piston allows flow of the fluid into the vent channel during movement of the sensing piston between the open and closed positions.

In a further non-limiting embodiment of the foregoing control assembly, the sensing piston is configured to restrict flow of the fluid into the vent channel in at least one of the open and closed positions.

In a further non-limiting embodiment of either of the foregoing control assemblies, the vent channel extends radially outward from an inner surface of the sensing chamber.

In a further non-limiting embodiment of any of the foregoing control assemblies, a shutoff spool is moveable within a porting sleeve between a locked position and an unlocked position in response to movement of the sensing piston. The shutoff spool is configured to restrict flow of a fluid through an actuation flow path when the shutoff spool is located in the locked position.

In a further non-limiting embodiment of any of the foregoing control assemblies, a signal port is configured to receive a signal pressure generated by a control unit. The control unit is operable to provide an amount of fluid to the actuation flow path.

In a further non-limiting embodiment of any of the foregoing control assemblies, each of the sensing sleeve and the sensing piston is received within a propeller shaft.

In a further non-limiting embodiment of any of the foregoing control assemblies, the actuator is operable to adjust a pitch of a rotor blade.

A method of operating a vent valve according to another exemplary aspect of the present disclosure includes, among other things, moving a sensing piston between an open position and a closed position in response to a change in flow of fluid, and allowing the fluid to flow into a vent channel out during movement of the sensing piston between the open and closed positions.

In a further non-limiting embodiment of the foregoing method of operating a vent valve, the method includes the step of restricting flow of the fluid into the vent channel when the sensing piston is located in at least one of the open and closed positions.

In a further non-limiting embodiment of either of the foregoing methods of operating a vent valve, the method includes the step of restricting flow of the fluid through an actuation flow path when the sensing piston is located in at least one of the open and closed positions.

These and other features disclosed herein can be best understood from the following specification and drawings, the following of which is a brief description.

DETAILED DESCRIPTION

Figure 1:
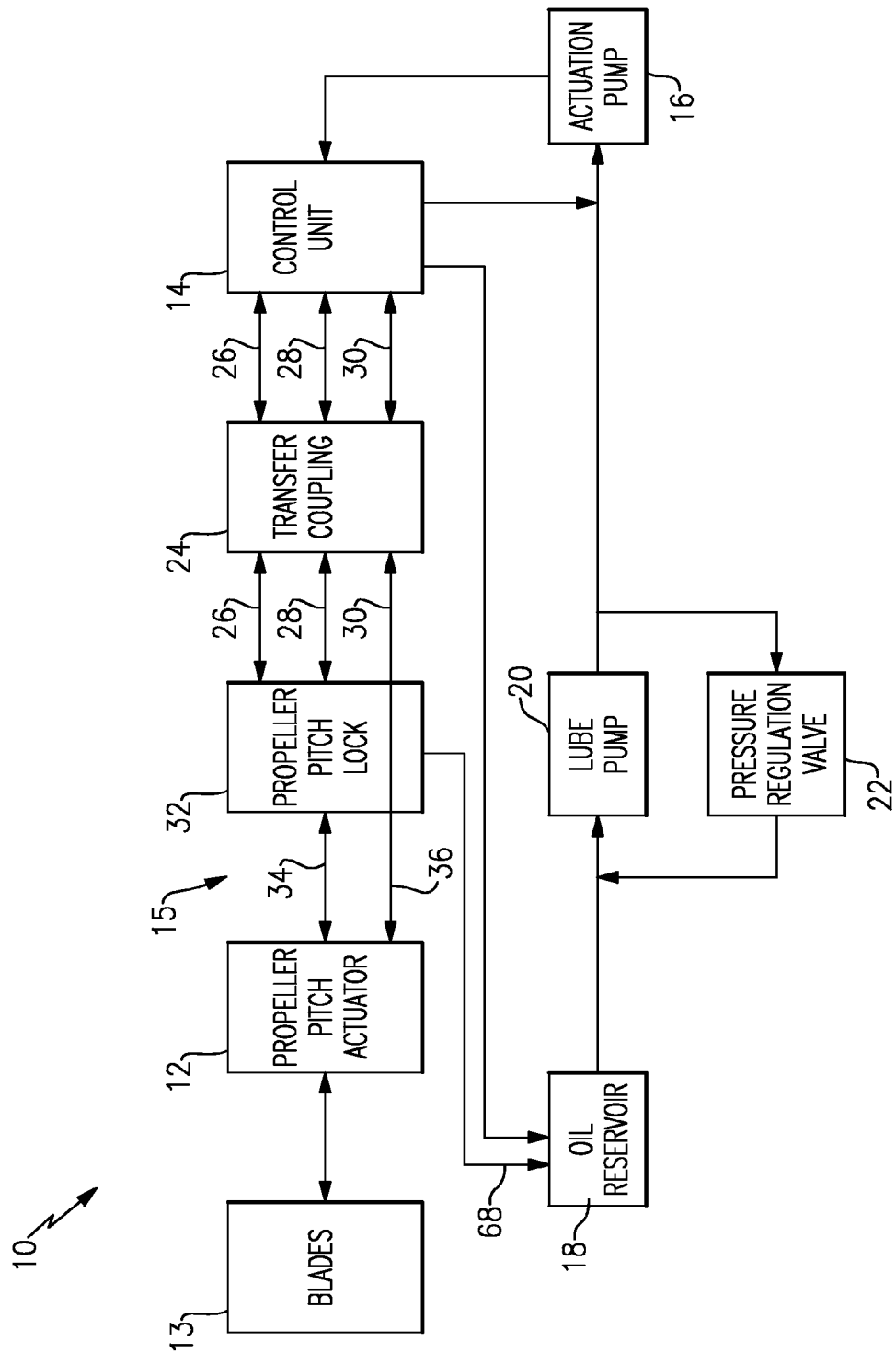
FIG. 1 is a schematic view of a propeller pitch control assembly.

FIG. 1 schematically illustrates a propeller pitch control assembly 10 that may be employed in a fixed wing or rotary aircraft. The propeller pitch control assembly 10 includes a fluid actuated propeller pitch actuator 12 configured to adjust and maintain a pitch of one or more rotor or propeller blades 13. Generally, the blades 13 are rotated by a gas turbine engine (not shown) to generate an amount of thrust. The propeller pitch actuator 12 adjusts the pitch of the blades 13 in response to a change in flow of a fluid through an actuation flow path 15, as discussed further below.

A control unit 14 is operable to provide an amount of fluid to the propeller pitch actuator 12 through the actuation flow path 15. The control unit 14 receives the fluid from an actuation pump 16. The actuation pump 16 may provide the fluid from an oil reservoir 18, for example. A lube pump 20 and a pressure regulation valve 22 may be disposed between the actuation pump 16 and the oil reservoir 18 to provide the fluid to the actuation pump 16 at a certain pressure level.

The actuation flow path 15 of the propeller pitch control assembly 10 includes a coarse pitch line 28 in fluid communication with a coarse pitch transfer tube 34. The actuation flow path 15 also includes a fine pitch line 30 in fluid communication with a fine pitch transfer tube 36. The pitch lines 28, 30 and transfer tubes 34, 36 provide a bi-directional flow of fluid between the propeller pitch actuator 12 and the control unit 14. In one embodiment, an increase in pressure in the coarse pitch line 28 and coarse pitch transfer tube 34 increases the pitch of the blades 13, and an increase in pressure in the fine pitch line 30 and fine pitch transfer tube 36 decreases the pitch of the blades 13. A transfer coupling 24 provides a flow path between the pitch lines 28, 30 and transfer tubes 34, 36 and through a propeller shaft 38 configured to rotate about a propeller axis A (shown in FIG. 2).

In the event of loss of pressure to the propeller pitch actuator 12, the pitch of the blades 13 may adjust in response to one or more external forces exerted on the blades 13. Accordingly, the propeller pitch control assembly 10 includes a propeller pitch lock 32 for regulating the flow of fluid between the propeller pitch actuator 12 and the control unit 14. The propeller pitch lock 32 is configured to minimize flow of a fluid to and from the propeller pitch actuator 12 to lock or maintain the pitch of the blades 13 until the pressure to the control unit 14 is restored.

The propeller pitch lock 32 is moveable between a locked position and an unlocked position in response to a pressure provided by a sensing flow path defined by a signal line 26, as discussed in detail below. The propeller pitch lock 32 provides the actuation flow path 15 between the coarse pitch line 28 and the coarse pitch transfer tube 34. The propeller pitch lock 32 also provides the actuation flow path 15 between the fine pitch line 30 and the fine pitch transfer tube 36. The propeller pitch lock 32 regulates the flow of fluid between the coarse pitch line 28 and the coarse pitch transfer tube 34, as discussed in detail below. In one embodiment, flow of the fluid through the coarse pitch line 28 is minimized when the propeller pitch lock 32 is located in the locked position, thereby minimizing an adjustment of the pitch of the blades 13. However, flow of the fluid through the coarse pitch line 28 is allowed when the propeller pitch lock 32 is located in the unlocked position. Thus, the propeller pitch actuator 12 may adjust the pitch of the blades 13 in response to flow of a fluid through the actuation flow path 15 when the propeller pitch lock 32 is located in the unlocked position.

Figure 2:
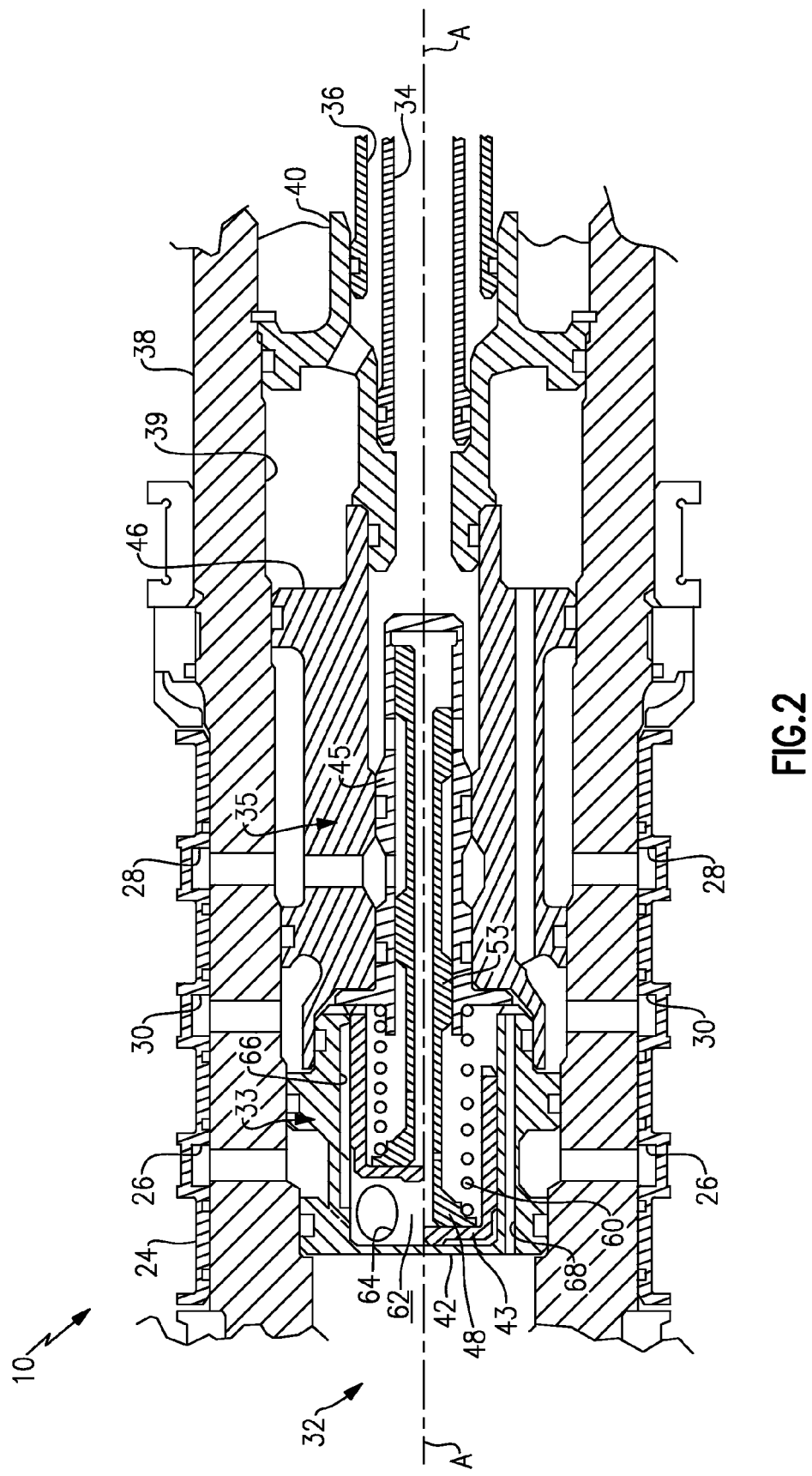
FIG. 2 is a cross sectional view of a propeller pitch lock including a vent valve and a locking valve.

FIG. 2 illustrates a cross sectional view of the propeller pitch lock 32. In one embodiment, the propeller pitch lock 32 is asymmetrical about the propeller axis A defined by the propeller shaft 38. More specifically, the propeller pitch control assembly 10 includes three sets (not shown) of pitch lines 28, 30 and one set of transfer tubes 34, 36 in fluid communication with the propeller pitch lock 32. Flow passages for each set of pitch lines 28, 30 and transfer tubes 34, 36 may be offset by one hundred and twenty (120) degrees with respect to the propeller axis A. However, other configurations and quantities of the pitch lines 28, 30 and transfer tubes 34, 36 are contemplated.

The propeller pitch lock 32 is received within a valve cavity 39 defined by the propeller shaft 38. The transfer coupling 24 is disposed about a circumference of the propeller shaft 38. Generally, the transfer coupling 24 is stationary relative to the propeller shaft 38, and the propeller pitch lock 32 rotates with the propeller shaft 38 about the propeller axis A. A transfer sleeve 40 and a carrier sleeve 46 are also received within the valve cavity 39. The transfer sleeve 40 provides a flow path for each of the coarse and fine pitch transfer tubes 34, 36. The carrier sleeve 46 provides a flow path for each of the coarse and fine pitch lines 28, 30. In one embodiment, the transfer sleeve 40 and the carrier sleeve 46 provide a continuous flow path between the transfer coupling 24 and the propeller pitch actuator 12. The propeller pitch lock 32 includes a locking valve 35 actuated by a vent valve 33.

Figure 3:
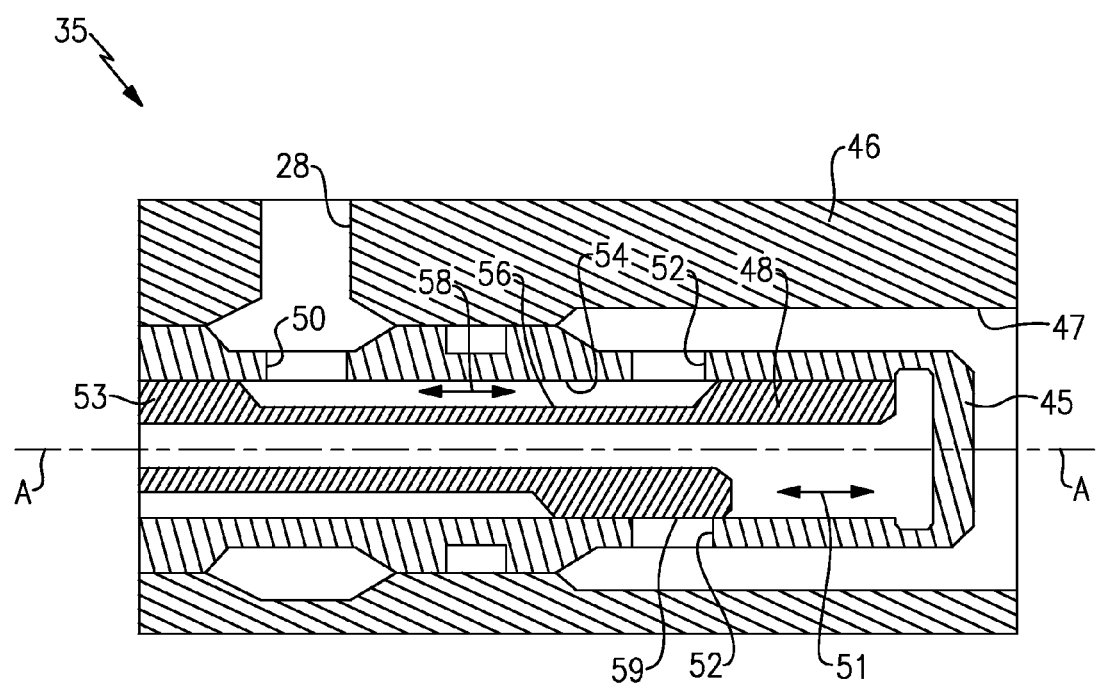
FIG. 3 is a partial cross sectional view of a locking valve.

Referring to FIG. 3, with continuing reference to FIG. 2, the locking valve 35 includes a porting sleeve 45 received within a bore 47 defined by the carrier sleeve 46. The porting sleeve 45 defines a first aperture 50 for providing fluid communication between the coarse pitch line 28 and an actuation chamber 54 defined by the porting sleeve 45. The porting sleeve 45 also defines a second aperture 52 for providing fluid communication between the actuation chamber 54 and the coarse pitch transfer tube 34.

A shutoff spool 48 is received within the actuation chamber 54 to regulate flow of a fluid through the actuation chamber 54 between the first and second apertures 50, 52. Generally, the shutoff spool 48 may have a circular configuration with respect to the propeller axis A. The shutoff spool 48 may also include a blockage portion 53 configured to minimize flow of a fluid between the actuation chamber 54 and the sensing chamber 62. In one embodiment, the shutoff spool 48 defines an actuation channel 56 extending radially inward from an outer surface 59 of the shutoff spool 48 and also extends a length along the propeller axis A between the first and second apertures 50, 52.

The shutoff spool 48 is moveable along the propeller axis A between the locked position and the unlocked position. The outer surface 59 of the shutoff spool 48 restricts flow of a fluid through the second aperture 52 when the shutoff spool 48 is located in the locked position (illustrated in the bottom portion of FIG. 3) and permits the flow of a fluid through the second aperture 52 when the shutoff spool 48 is located in the unlocked position (illustrated in the top portion of FIG. 3).

Figure 4:
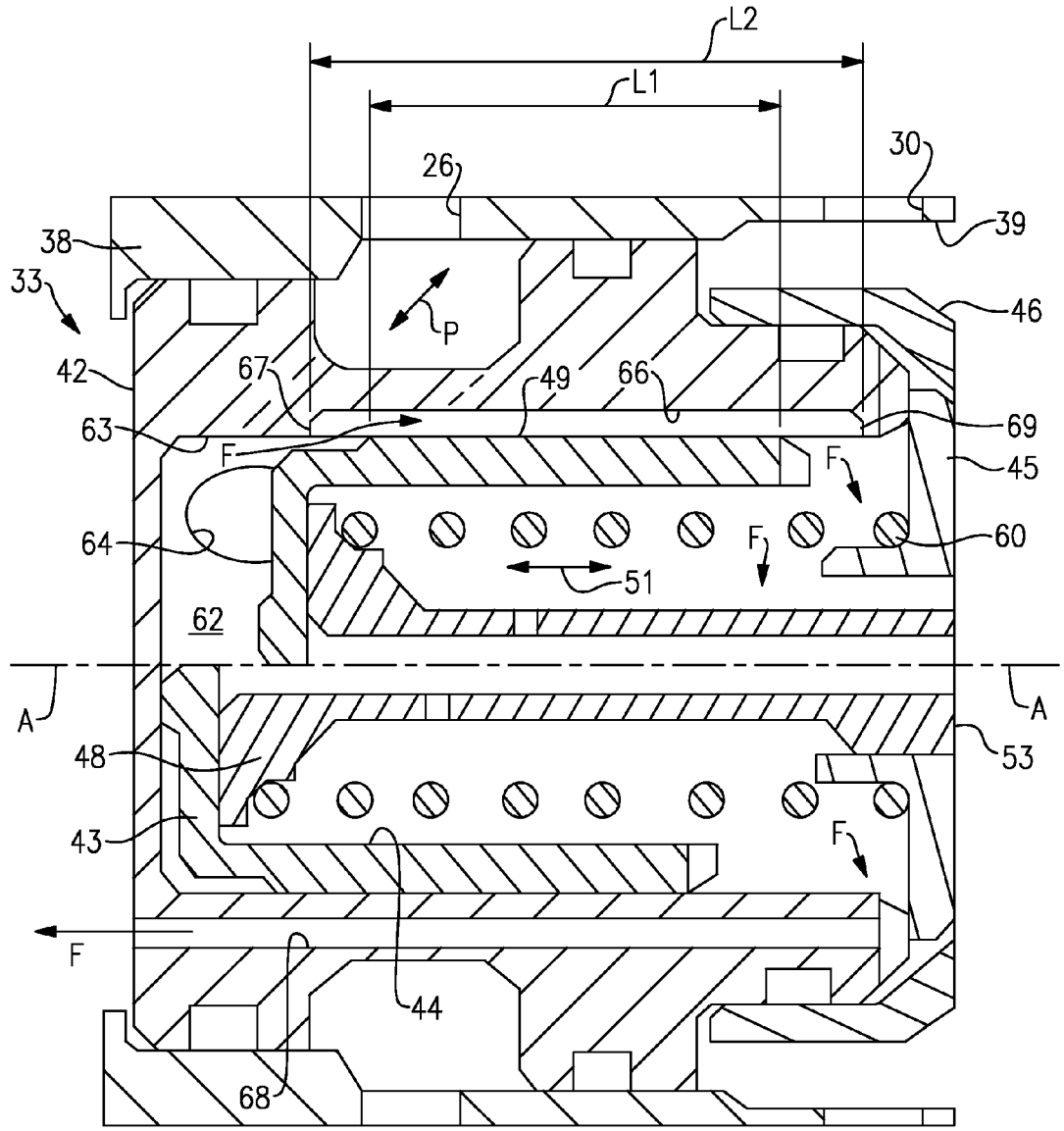
FIG. 4 is a cross sectional view of a vent valve.

FIG. 4 illustrates a cross sectional view of the vent valve 33. The vent valve 33 includes a sensing sleeve 42 and a sensing piston 43. The sensing piston 43 is received within a sensing chamber 62 defined by the sensing sleeve 42. The sensing piston 43 is moveable in an axial direction 51 between an open position (illustrated in the top portion of FIG. 2) and a closed position (illustrated in the bottom portion of FIGS. 2 and 4). A peripheral surface 49 of the sensing piston 43 cooperates with an inner surface 63 of the sensing chamber 62 to minimize flow of a fluid between the sensing chamber 62 and the sensing piston 43.

The sensing piston 43 defines a piston cavity 44 that receives a return spring 60. In one embodiment, the return spring 60 is a coil spring extending between the piston cavity 44 and the porting sleeve 45. However, other spring configurations are contemplated. The sensing chamber 62 is provided with a signal port 64 in fluid communication with the signal line 26. The signal line 26 provides an amount of fluid at a signal pressure P. The return spring 60 compresses when the sensing pressure P provided to the sensing chamber 62 overcomes a spring force of the return spring 60. The return spring 60 decompresses when the sensing pressure P is insufficient to overcome the spring force of the return spring 60, locating the sensing piston 43 in the closed position.

Generally, the shutoff spool 48 is moveable between the locked and unlocked positions in response to movement of the sensing piston 43. In one embodiment, an end of the shutoff spool 48 is received within the piston cavity 44. The sensing piston 43 may be attached to the shutoff spool 48. In another embodiment, the sensing piston 43 and the shutoff spool 48 are integrally formed. Accordingly, the shutoff spool 48 is located in the locked position when the sensing piston 43 is located in the closed position (shown in the bottom portion of FIG. 2), and the shutoff spool 48 is located in the unlocked position when the sensing piston 43 is located in the open position (shown in the top portion of FIG. 2). In another embodiment, the shutoff spool 48 is located in the locked position when the sensing piston 43 is located in the open position.

In one embodiment, the sensing sleeve 42 defines a vent channel 66 extending radially outward from the inner surface 63 of the sensing chamber 62. The vent channel 66 extends between a first end 67 and a second end 69. The peripheral surface 49 of the sensing piston 43 extends a first length L1 along the propeller axis A. The vent channel 66 extends a second length L2 along the propeller axis A. Generally, the second length L2 is greater than the first length L1 of the peripheral surface 49 of the sensing piston 43. However, other configurations of the vent valve 33 are contemplated. In another embodiment, the vent channel 66 is defined within a thickness of sensing sleeve 42. In yet another embodiment, the sensing piston 43 defines at least a portion of the vent channel 66.

When the sensing piston 43 is located between the open and closed positions (illustrated in the top portion of FIG. 4), the sensing piston 43 allows flow of a fluid F from the sensing chamber 62 into the vent channel 66. The fluid F passes through the vent channel 66 into the piston cavity 44. From the piston cavity 44, the fluid F passes around the shutoff spool 48 and into the drain passage 68. Generally, the fluid F within the sensing chamber 62 opposes axial movement of the sensing piston 43 toward the closed position. Thus, the vent channel 66 provides additional flow of fluid F out of the sensing chamber 62 in addition to the signal line 26, thereby decreasing the response time for actuation of the vent valve 33.

However, the sensing piston 43 restricts flow of the fluid F into the vent channel 66 when the sensing piston 43 is located in both the open and closed positions. More specifically, the sensing piston 43 blocks the second end 69 of the vent channel 66 when the sensing piston 43 is located in the open position (shown in the top portion of FIG. 2). The sensing piston 43 blocks the first end 67 of the vent channel 66 when the sensing piston 43 is located in the closed position (generally shown in FIGS. 2 and 4). Accordingly, the sensing piston 43 minimizes a parasitic loss of fluid from the sensing chamber 62 when the sensing piston 43 is located in either the open or closed positions.

One exemplary operation of the propeller pitch lock 32 is as follows. Prior to operation of the aircraft, the pressure within the sensing chamber 62 is below a predetermined threshold. Accordingly, the return spring 60 decompresses and the sensing piston 43 is located in the closed position. During system initialization, the control unit 14 provides a sensing pressure P to the signal port 64 by increasing the pressure of the fluid within the signal line 26. The fluid within the sensing chamber 62 compresses the return spring 60. Movement of the sensing piston 43 toward the open position causes the shutoff spool 48 to be located in the unlocked position. Accordingly, the control unit 14 may adjust the flow of fluid through the coarse and fine pitch lines 28, 30 to cause the propeller pitch actuator 12 to increase, decrease or maintain the pitch of the blades 13.

In the event of loss of pressure to the actuation pump 16 and the control unit 14, the control unit 14 will cease to provide the sensing pressure P to the signal port 64. Accordingly, the pressure within the sensing chamber 62 decreases, causing the return spring 60 to move the sensing piston 43 in the axial direction 51 toward the closed position. The shutoff spool 48 also moves in the axial direction 51 to the locked position. Thus, the shutoff spool 48 blocks the actuation flow path 15, causing the propeller pitch actuator 12 to lock or maintain the pitch of the blades 13 until the sensing pressure P is restored.

Accordingly, the vent valve 33 of this disclosure provides several benefits. The flow path provided by the vent channel 66 improves the responsiveness of the locking valve 35. Also, the vent valve 33 minimizes a parasitic loss of fluid caused by fluid passing from the sensing chamber 62 through the vent channel 66 during normal operation of the propeller pitch actuator 12. Generally, the parasitic loss of fluid causes additional consumption of energy by the actuation pump 16.

Although the different embodiments have the specific components shown in the illustrations, embodiments of this disclosure are not limited to those particular combinations. It is possible to use some of the components or features from one of the embodiments in combination with features or components from another one of the embodiments. The present disclosure is not limited to a propeller pitch control or a rotary aircraft. The vent valve may also be used in any fluid system, whether the fluid system is stationary or mobile. Generally, the vent valve 33 of this disclosure may be included in any fluid actuated assembly requiring a shortened response time, such as door lock mechanisms and radiator louvers.

The preceding description is exemplary rather than limiting in nature. Variations and modifications to the disclosed embodiments may become apparent to those skilled in the art that do not necessarily depart from the essence of this disclosure. The scope of legal protection given to this disclosure can only be determined by studying the following claims.

What is claimed is:

1. A control assembly comprising:
   an actuator operable in response to a change in flow of a fluid through an actuation flow path;
   a lock assembly including a vent valve having a sensing sleeve and a sensing piston, said sensing sleeve defining a sensing chamber for receiving said sensing piston and defining a vent channel for venting said fluid out of said sensing chamber and into a piston cavity defined by said sensing piston, wherein each of said sensing sleeve and said sensing piston is received within a propeller shaft, and said propeller shaft is rotatable about a propeller axis, and each of said shutoff spool and said sensing piston extends along said propeller axis;
   a shutoff spool moveable within a porting sleeve between a locked position and an unlocked position in response to movement of said sensing piston, wherein said shutoff spool is configured to restrict flow of a fluid through an actuation flow path when said shutoff spool is located in said locked position;

a signal port configured to receive a signal pressure generated by a control unit, said control unit being operable to provide an alount of fluid to said actuation flow path;

a transfer coupling disposed about a circumference of said propeller shaft;

a drain passage in fluid communication with said vent channel and an oil reservoir;

wherein said sensing piston is moveable within said sensing chamber between an open position and a closed position, said sensing piston allowing flow of said fluid into said vent channel during movement of said sensing piston between said open and closed positions, and wherein said sensing piston is configured to restrict flow of said fluid into said vent channel when in said open position; and wherein said actuation flow path includes a coarse pitch line and a fine pitch line each coupled to said actuator, said transfer coupling is configured to couple said coarse pitch and fine pitch line to said control unit, said transfer coupling is configured to coupled said signal port and said control unit such that movement of said sensing piston towards the close position in response to the signal pressure causes fluid in said sensing chamber to flow out through said signal port and causes fluid in said sensing chamber to flow out through said vent channel and then out through said drain passage.

2. The control assembly of claim 1, wherein said sensing piston is configured to restrict flow of said fluid into said vent channel in both said open and closed positions.

3. The control assembly of claim 1, wherein said vent channel extends radially outward from an inner surface of said sensing chamber.

4. The control assembly of claim 1, wherein said actuator is operable to adjust a pitch of a rotor blade.

5. The control assembly of claim 2, wherein said sensing piston is configured to block a first end of said vent channel in the open position, and is configured to block a second end of said vent channel in the closed position.

6. The control assembly of claim 5, wherein said vent channel is a groove in said sensing chamber, and a peripheral surface of said sensing piston is configured to bound a length of said groove.

7. The control assembly of claim 2, wherein said vent channel includes a first port coupled to said sensing chamber, and a second port coupled to said piston cavity, each of said first and second ports being defined at different axial positions relative to said sensing sleeve in response to movement of said sensing piston within said piston cavity.

* * * * *